United States Patent [19]

Null et al.

[11] Patent Number: 4,631,073
[45] Date of Patent: Dec. 23, 1986

[54] METHOD AND APPARATUS FOR THE ADSORPTIVE FRACTIONATION OF GASES

[75] Inventors: Robert A. Null; Lonnie C. Laughlin, both of Littleton; Michael L. Goldberg, Breckenridge, all of Colo.

[73] Assignee: Wilkerson Corporation, Englewood, Colo.

[21] Appl. No.: 752,098

[22] Filed: Jul. 5, 1985

Related U.S. Application Data

[63] Continuation of Ser. No. 590,348, Mar. 16, 1984, abandoned, which is a continuation of Ser. No. 590,013, Mar. 15, 1984, Pat. No. 4,559,065.

[51] Int. Cl.$^4$ ............................................. B01D 53/04
[52] U.S. Cl. .......................................... 55/18; 55/33; 55/62; 55/161; 55/179; 55/275
[58] Field of Search ..................... 55/33, 35, 161–163, 55/179, 180, 275, 387, 389, 18, 20, 21, 58, 62, 74, 75

[56] References Cited

U.S. PATENT DOCUMENTS

| | | | |
|---|---|---|---|
| 2,101,555 | 12/1937 | Moore et al. | 55/179 X |
| 2,625,237 | 1/1953 | Gribler et al. | 55/179 X |
| 2,703,628 | 3/1955 | Pompeo et al. | 55/179 X |
| 2,717,050 | 9/1955 | Ames | 55/33 X |
| 2,944,627 | 7/1960 | Skarstrom | 55/58 X |
| 3,138,439 | 6/1964 | Skarstrom | 55/179 X |
| 3,258,899 | 7/1966 | Coffin | 55/162 |
| 3,323,288 | 6/1967 | Cheung et al. | 55/62 X |
| 3,323,291 | 6/1967 | Kern | 55/179 X |
| 3,323,292 | 6/1967 | Brown | 55/163 X |
| 3,324,631 | 6/1967 | Kreuter | 55/163 |
| 3,543,482 | 12/1970 | Foster | 55/179 X |
| 3,552,096 | 1/1971 | Dayson | 55/179 X |
| 3,594,990 | 7/1971 | Hawley | 55/162 |
| 3,849,089 | 11/1974 | Ritter et al. | 55/33 |
| 4,197,095 | 4/1980 | White, Jr. et al. | 55/179 X |
| 4,247,311 | 1/1981 | Seibert et al. | 55/179 X |
| 4,302,224 | 11/1981 | McCombs et al. | 55/179 X |

Primary Examiner—Robert Spitzer
Attorney, Agent, or Firm—Ralph F. Crandell

[57] ABSTRACT

A method and apparatus for adsorptive fractionation of a gaseous mixture. A twin tower fractionator or dryer apparatus includes a pair of sorbent beds. A filter and valve assembly directs a flow of the gaseous mixture from a source thereof to one of the beds for removing a gaseous component of said mixture while simultaneously directing a flow of purge gas through the other of said beds for stripping the adsorbed gas component therefrom and regenerating the bed. Microprocessor controlled valves control the flow of gases to and from said beds. The towers and associated manifolds are twin bore extrusion prism shaped of heat conductive material. The parallel bores extend axially longitudinally through the tower extrusion with each bore adapted to contain a sorbent bed or bed cartridge. Conductivity probes are used to sense the moisture or adsorbed component front in the sorbent bed. The adsorption cycle is controlled by controlling the cycling of the purge-valves which control flow of purge or regeneration gas through one of the beds while the other is on stream for adsorption.

25 Claims, 18 Drawing Figures

Fig_3

Fig_4

Fig_5

Fig_6

Fig_8

Fig_10

Fig_11

Fig_12

Fig_13

Fig_14

Fig_15

Fig_16

Fig_17

FLOP = SHIFT TO OPPOSITE TOWER = 1 MIN. TO 15 MIN.
A = END OF PURGE
C = END OF PURGE
REPRESSURIZATION TIME = 15 SEC. TO FLOP TIME
DRAIN TIME = 0.1 TO 10 SEC.

Fig_18

METHOD AND APPARATUS FOR THE ADSORPTIVE FRACTIONATION OF GASES

CROSS REFERENCE TO RELATED APPLICATIONS

This is a continuation of application Ser. No. 590,348, filed Mar. 16, 1984, now abandoned. Application Ser. No. 590,348 was a continuation of application Ser. No. 590,013, filed Mar. 15, 1984, now U.S. Pat. No. 4,509,065.

BACKGROUND OF THE INVENTION

1. Field of the Invention

The present invention relates to apparatus for the adsorptive fractionation of a gaseous mixture, and more particularly to a twin tower dryer apparatus finding particular but not necessarily exclusive use for drying compressed air.

More specifically, the present invention relates to an improved method of controlling the adsorption and desorption of the sorbent beds of a twin tower fractionation apparatus by controlling substantially only the open and closed condition of two purge valves operatively associated with the twin tower fractionation apparatus.

2. Brief Description of the Prior Art

Twin tower gas adsorbers have been marketed for many years and are in widespread use for a variety of processes involving the adsorptive separation of gaseous components, such as for the removal of moisture from compressed air. Apparatus of this type generally comprises two adsorbent or desiccant beds, one of which is adapted to be on an adsorption or drying cycle, while the other is being purged of the adsorbed component and regenerated for reuse. In the drying of compressed air, for example, air to be dried is passed through one bed and, when the adsorptive capacity of that bed is reached or approached, the air is cycled to the other bed while the first bed is purged of moisture, usually by utilizing a lower pressure purge gas flow tapped from the dry air outlet.

Many forms of control devices have been utilized for such twin tower dryers. Basically, appropriate valves are utilized to direct the air or gas flow through the dryer in a predetermined cycle, with control or timer devices being provided to produce the desired cycles. Control valves are utilized which are actuated in any suitable manner such as mechanically, electrically by solenoids, electronically, pneumatically, or otherwise. A variety of timers can be employed, all of which are generally equivalent and produce the desired timed cycles. Among the types of timers are mechanical clocks, electrical or electronic timers, and microprocessors.

The advent of microprocessors has led logically to the use of such data processing devices for control purposes. Such devices are able to handle more complex data and hence it is possible to incorporate into the timing cycle the consideration of various factors such as moisture content, pressures and temperatures, and to adjust the cycle according to variations in such parameters. Those of ordinary skill in the microprocessor art are readily able to utilize such technology for the control of a wide variety of chemical and physical processes, including the adsorption of gases and regeneration of adsorbent beds. Timing devices including mechanical, electrical, electronic, pneumatic or microprocessor timing devices are equivalent and may be utilized effectively. Likewise, various types of control valves, such as solenoid actuated valves, pneumatic valves, pilot actuated valves and the like, may be utilized to advantage.

Twin or multiple tower gas adsorption apparatus may be utilized for many different chemical processes and their use is not limited to the drying of gases such as air, but extends generally to the fractionation of various gaseous mixtures. Gas adsorption is an ancient process which has been utilized in many chemical processes. Purging or regeneration of the adsorbent bed has been carried out in a variety of ways, including the use of heat as well as heatless purge cycles. Principally, the saturated sorbent bed is purged or regenerated by utilizing a gas stream low in the adsorbed material, and the purge is ordinarily carried out at a pressure lower than the pressure of the adsorption stage, and often at a temperature higher than that of the adsorption stage. In some instances, heat has been added to the purge stage to enhance the regeneration.

Twin tower dryer or gas adsorbing apparatus in which the towers are adapted for alternate adsorbing and purge operations are shown in the prior art. See, for example, U.S. Pat. No. 2,944,627, issued July 12 1960, to C. W. Skarstrom, for "Method and Apparatus for Fractionating Gaseous Mixtures by Adsorption"; U.S. Pat. No. 3,138,439, issued June 23, 1964, to C. W. Skarstrom, for "Apparatus and Process for Heatless Fractionation of Gaseous Constituents"; U.S. Pat. No. 3,258,899, issued July 5, 1966, to T. E. Coffin, for "Apparatus for Fractionating Gaseous Mixtures"; U.S. Pat. No. 3,552,096, issued Jan. 5, 1971, to P. Dayson, for "Apparatus for Drying Air or Other Gas"; and U.S. Pat. No. 3,323,292, issued June 6, 1967, to C. D. Brown, for "Apparatus for Fractionating Gaseous Materials."

OBJECTS AND SUMMARY OF THE INVENTION

It is the principal object of the present invention to provide an improved twin tower apparatus for the adsorptive fractionation or drying of gases.

It is a related principal object of the present invention to provide an improved method for controlling the adsorption and desorption of the sorbent beds of a twin tower gas fractionating apparatus.

It is another object of the present invention to control the adsorption and desorption functions of a twin tower fractionation apparatus by controlling substantially only two purge valves associated with said apparatus.

It is another object of the present invention to provide an improved twin tower gas fractionation apparatus including means for controlling the adsorption and desorption functions of the apparatus by the use of pressure responsive flow control valves which are operatively controlled by opening and closing purge valves associated with the fractionation apparatus, thereby achieving an improved and simplified flow control arrangement for said fractionation apparatus.

Other objects and advantages of the present invention will become apparent as the following description proceeds.

A twin tower dryer embodying the present invention comprises a pair of adsorbent bed towers together with micro-processor air logic controlled, air pilot operated, purge control valves, either pilot operated or flip-flop inlet valves, and a check-type exhaust system. More specifically, the twin tower dryer comprises a modular pair of packed tower chambers, each tower chamber containing an adsorbent, such as a desiccant, for removing moisture from compressed air. Valving is provided for feeding compressed, high pressure gas rich in a component, such as relatively moist compressed air, rich in water to one end of one tower chamber and withdrawing relatively depleted gas or dry air from the other end of the tower, with only a pressure drop resulting from the flow of gas through the tower and valving. Simultaneously, the adsorbent bed in the second tower chamber is regenerated or purged of moisture or the adsorbed component, so as to be ready for further adsorption. This purge is accomplished by bleeding a portion of the relatively dry air or depleted gas from the outlet of the first tower chamber, reducing the pressure of such purge gas, and using that low pressure purge gas to dry or regenerate the adsorbent or desiccant in the second tower chamber. Periodically the tower chambers are reversed so as to purge each tower in alternate succession with use of that tower for adsorption.

In accordance with its principal aspects, the method of the present invention is for controlling the adsorption and desorption of the sorbent beds of a twin tower fractionation apparatus by controlling substantially only the opening and closing of each of two purge valves, and thereby supplying a substantially continuous flow of fractionated gas from which an adsorbable component has been adsorbed. Each tower of the fractionation apparatus contains a sorbent bed through which a flow of pressurized gaseous mixture is passed and in which the adsorbable component is adsorbed by the sorbent bed. Each sorbent bed is also operatively desorbed or purged of the component upon flowing a purge gas therethrough, the purge gas taking up the adsorbed component from the sorbent bed. The gaseous mixture is directed to a selected one of the first or second sorbent beds in the first and second towers, respectively, by a differential pressure responsive inlet valve. The inlet valve is connected to an inlet manifold which defines bores in fluid communication with each of the two towers. The inlet valve is responsive to the differential pressures between the two bores in the inlet manifold. First and second purge valves are respectively connected in fluid communication with the bores of the inlet manifold, which in turn are in fluid communication with the first and second sorbent beds. The gaseous mixture is selectively directed into each sorbent bed by opening one of the purge valves. The selected purge valve, when opened, reduces the pressure is one bore of the inlet manifold and thereby causes the inlet valve selectively to direct the gaseous mixture into the desired sorbent bed as a result of pressure differentials created therein. By opening and closing each purge valve alternately with the opening or closing of the other purge valve, a continuous supply of fractionated gas is delivered from the fractionating apparatus. Opening one of the purge valves also causes a flow of purge gas derived from the gas exiting one of the sorbent beds to flow through the other sorbent bed and to regenerate the other sorbent bed.

In describing the present invention, for purposes of convenience reference will be made to the drying of compressed air utilizing a desiccant. It should be understood, however, that the apparatus is not so limited and may be used for any adsorption fractionation process for removing one or more components of a gas mixture.

The twin tower dryer disclosed herein comprises an integral two chamber tower module. The module is in the form of an elongated prism, rectangular in cross-section, and containing two parallel bores defining cylindrical tower chambers for containing an adsorbent material such as a desiccant. The prisms are preferably aluminum extrusions, and may be of any length depending upon the height of the adsorbent column desired and the desired ratio of the column height to the diameter of the cylindrical bores. The adsorbent material may be placed directly in the chambers or adsorbent filled cartridges may be inserted into the chamber bores.

Manifolds are provided at both the upper and lower end of each tower for conducting gas such as compressed air to and from the tower chambers or bores. A plurality of tower modules may be aligned side by side to provide as few as one "twin tower" section, or as many twin tower sections may be used as desired to provide a predetermined adsorbent and flow capacity.

The inlet and outlet manifolds are made up of modular prism units, similar in configuration to the tower prism, but with lateral ports cut to coincide with and provide openings into the chambers in each tower module unit. Gaskets, or other appropriate sealing means are provided where appropriate to effect a tight seal between the tower modules and the manifold sections when the units are bolted together.

When the parallel chambers in each tower module are filled with moisture adsorbing material, one chamber of each module receives moist input compressed air to be dried, while the other chamber is simultaneously purged or regenerated. This is accomplished in the integral tower module, thereby conserving space as well as heat energy which is readily transferred or conducted between the adsorbent beds. Predetermined tower capacity is readily accomplished by the parallel addition or removal of tower modules.

Air flow through the chambers, whether there is only one twin tower module or a plurality of tower modules in parallel, is controlled by controlling the flow of air through a single input manifold and a single output manifold. This is accomplished by air pilot actuated valves either at the input end of the inlet manifold, or at the purge end of the inlet manifold, or both. The valves are readily time controlled, although other parameters may be utilized to control the air drying and regeneration cycles. The unit is highly compact yet easily constructed to provide the desired air flow capacity.

One form of inlet control valve embodies a valve plenum which has outlet ports directed into a corresponding chamber of the input manifold. The ports are alternately opened or closed to a main air inlet port by double acting, spring return air cylinder actuated valves, or, in a preferred form of the invention, by a flip-flop type valve. Double-acting air cylinders, if used, are controlled by an air operated four-way valve which is in turn controlled by a three-way electric solenoid operated valve which connects the four-way valve to a pilot air supply. The timer circuit may be actuated in any appropriate manner such as by relays, an electric clock, an electronic digital timer circuit, a microprocessor, or the like.

An outlet manifold is positioned across the end of the tower opposite from the inlet manifold, and usually forms the top of the assembly. The outlet manifold includes manifold chambers which communicate with corresponding sets of tower module chambers and, at its output end, includes appropriate check valves to prevent back flow. The outlet manifold also includes a restriction or orifice opening between the two manifold chambers to provide a flow of lower pressure regeneration air for the purge cycle.

The outlet check valve construction includes a valve plenum which supports check valves between each manifold chamber and a main outlet port. The check valves are normally spring biased to their closed position and, depending upon which set of chambers is being used for drying, open to provide high pressure output flow. The opposite outlet manifold chamber is thus maintained at a lower pressure, as the corresponding check valve remains closed to the outlet port to prevent back flow of dried air through the saturated adsorbent.

At the end of the inlet manifold opposite from the inlet control valves there are provided air pilot actuated purge valves and mufflers. The purge valves function to shut off regeneration air after the adsorbent column has been regenerated. Regeneration normally occupies a shorter time cycle than moisture adsorption since it is carried out at a lower pressure than is the adsorbing cycle.

The purge valves may incorporate modular pressure regulation and filter components based on available stock items. These valves are normally closed pilot operated valves. The pilot air control is a conventional system.

The timing cycle for a conventional drying operation for two towers, each "tower" of which may comprise a plurality of tower module chambers in parallel, provides for a first tower or set of towers A to be on a drying cycle while a second tower or set of towers B is on a purge or regeneration cycle. The towers are then switched to allow tower A to be regenerated while tower B is drying the input air. The cycle is continuously repeated to provide a continuous drying operation.

The particular timing cycle may be determined by a timer device with all cycle periods preset or it may be determined by measuring the moisture content of the dessicant in each tower, or by a combination of such moisture measurement and time. Other parameters may be measured, and a microprocessor may be utilized to correlate the data and to provide optimum drying and regeneration times.

DESCRIPTION OF THE PREFERRED EMBODIMENT

Figure 1:
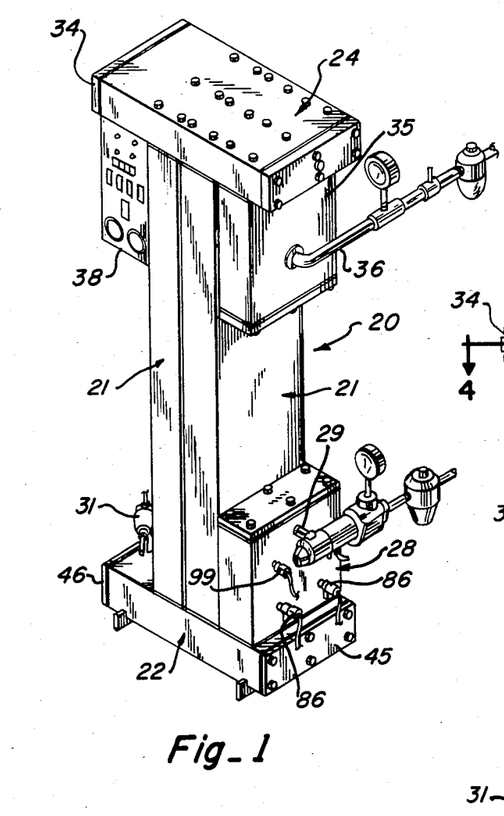
FIG. 1 is an isometric view of a twin tower adsorptive gas fractionation apparatus embodying the present invention.

The present invention is embodied in a twin tower dryer gas adsorption apparatus 20, one illustrative modification of which is shown in FIG. 1. The gas adsorption apparatus or tower comprises one or more adsorbent bed towers 21, aligned side by side on an inlet manifold 22 and capped by an outlet manifold 24. Each tower section 21 defines a pair of side by side cylinder bores 25, 26 for containing adsorbent materials. The number of tower sections used determines the bed capacity. At one end of the inlet manifold 22 there is provided an inlet valve and filter assembly 28 adapted to receive a gas, such as compressed air, through an air inlet 29, from a source thereof such as an air compressor (not shown).

At the opposite end of the inlet manifold 22 there is provided a purge valve and muffler assembly including a pair of purge valves 30, 31 opening to a purge outlet conduit and muffler 32. The outlet manifold 24 supports a repressurization valve assembly 34 at one end, and at its other end supports an outlet check valve assembly 35 opening to an outlet port and conduit 36. The outlet manifold 24 also conveniently mounts the control unit 38 which contains the various electrical and pneumatic controls utilized for operation of the apparatus. The complete apparatus is secured together by bolts with sealing gaskets to prevent gas leakage.

The tower sections 21 and manifolds 22, 24 are shown in detail in FIGS. 1 through 5 inclusive. Each tower section 21 is a generally rectangular, elongated prism constructed of heat conducting material, such as aluminum, and defines a pair of spaced, parallel, bores or cylinders 25, 26, or the like extending axially therethrough generally parallel to the longitudinal axis of the tower prism 21.

The length or height of each tower section 21, while not a critical factor, should generally provide a ratio of tower height to equivalent bore diameter in the range of about 10 to 1 to about 15 to 1, and preferably of about 13 to 1. The cross-sectional area of each of the bores 25, 26 must be sufficient to provide for adequate gas flow, and will generally be about 9 to about 14 square inches, for example about 10 square inches. In the form of tower prism 21 as shown, the prism has a width of about 8 to 9 inches and a depth of about 4 to 5 inches.

The manifolds, that is the inlet manifold 22 and outlet manifold 24, are of a prismatic configuration and construction similar to that of the tower, and define inlet manifold bores 40, 41 in the inlet manifold 22, and outlet manifold bores 42, 43 in the outlet manifold 24. End caps 45 close the ends of the bores in the inlet manifold. Apertures or ports 49, 50 are provided in the upper wall or face 51 of the inlet manifold 22 corresponding to the tower bores 25, 26, and opening into the manifold bores 40, 41. Apertures or ports 53, 54 are provided in the lower wall or face 55 of the outlet manifold 24 corresponding to the tower bores 25, 26, and opening into the manifold bores 42, 43. Gaskets 56 are utilized to provide a seal between the tower sections and the manifolds. The ends of the inlet and outlet manifolds 22, 24 extend beyond the towers 21 to provide supporting areas for the various control valve configurations and controls. The bottom or inlet manifold 22 extends beyond the tower on both sides thereof. At one end, the inlet or bottom manifold 22 is provided with upwardly directed ports 58, 59 opening into the manifold bores 40, 41, for alignment with the inlet valve and filter assembly 28. At its opposite end, the inlet manifold is provided with apertures 61, 62 opening upwardly for alignment of the manifold bores 40, 41 with the purge valves 30, 31 of the purge valve and muffler assembly. The top or outlet manifold 24 likewise extends beyond the edges of the tower, and at one end is provided with openings 64, 65 adapted for alignment of the manifold bores 42, 43 with the exhaust gas check valve assembly 35. At its other end the top manifold supports the repressurization valve assembly 34 in communication with the manifold bores 42, 43.

The various sections and assemblies are essentially modular and can be readily mounted or dismounted for repair or replacement without affecting the remaining assemblies. For example, it is a simple matter to remove and replace the inlet filter and shuttle valve assembly 28 should repairs be necessary. It is also a simple matter to size the manifolds for use with one or more tower sections 21. A manifold can be removed and the sorbent composition or cartridge can be readily replaced.

Figure 2:
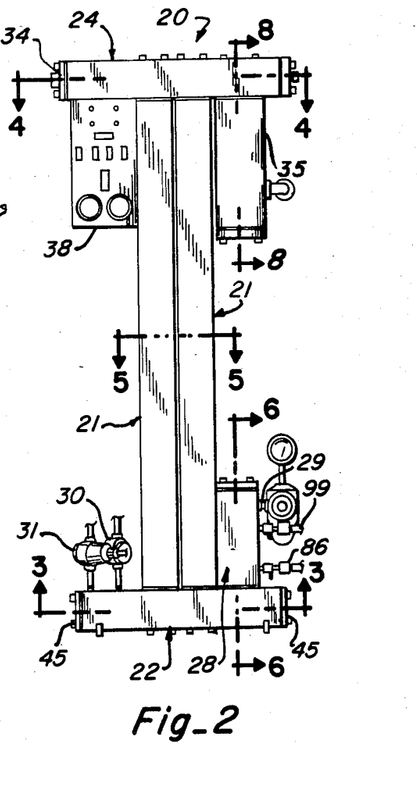
FIG. 2 is a side elevation view of the apparatus shown in FIG. 1
Figure 6:
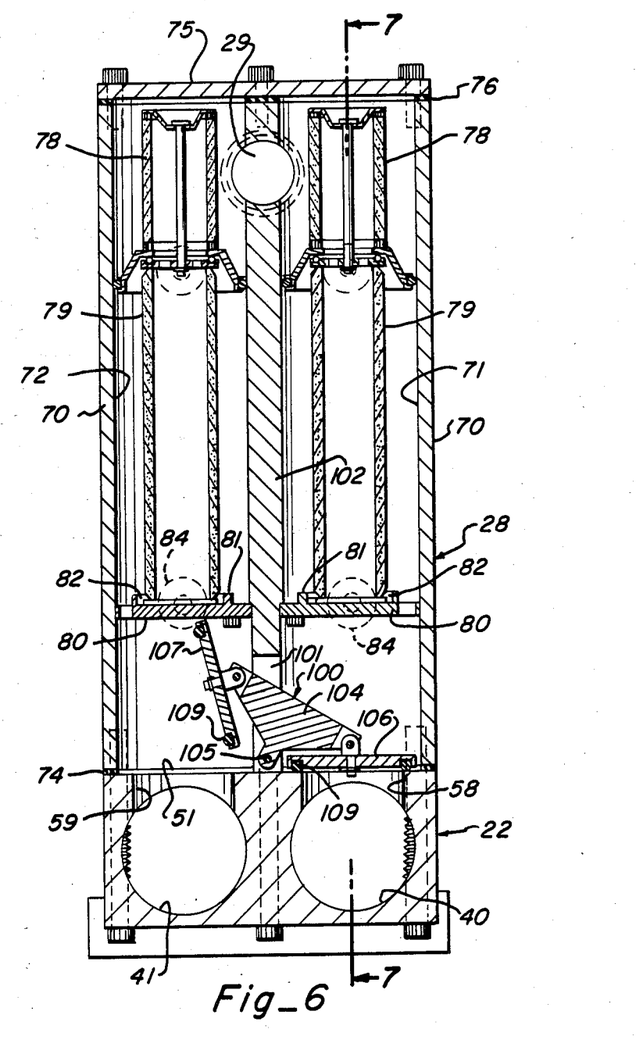
FIG. 6 is an enlarged section view taken substantially in the plane of line 6—6 in FIG. 2.
Figures 7, 9:
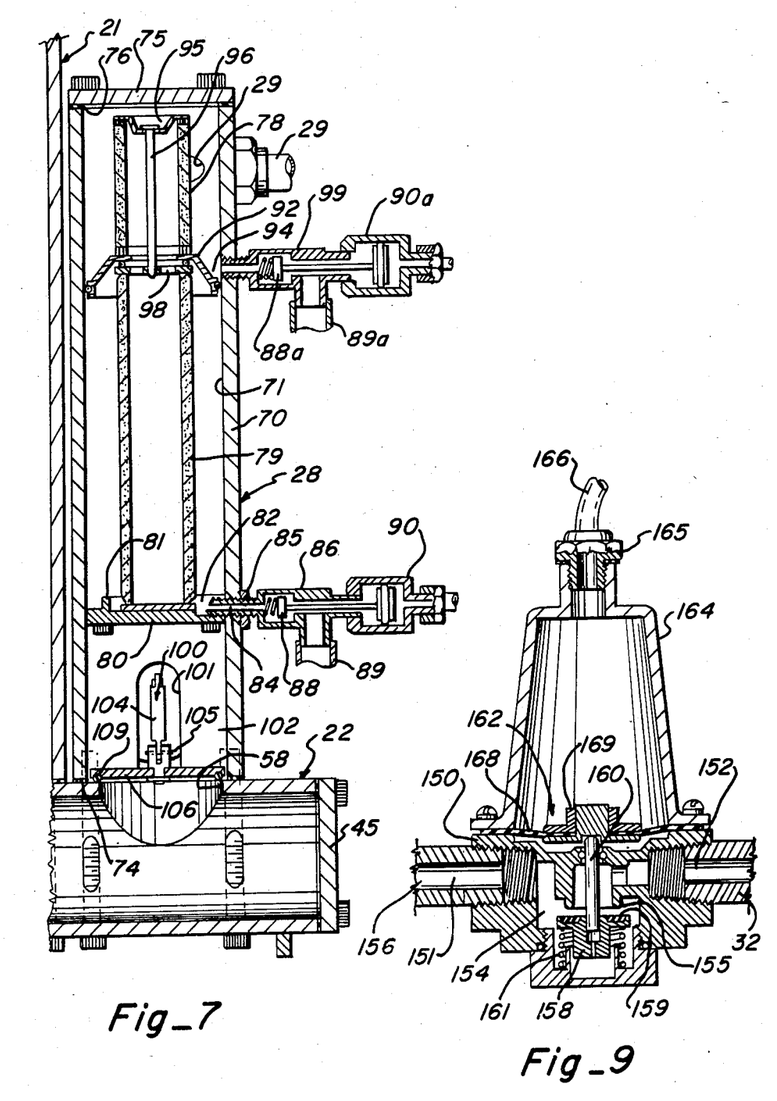
FIG. 7 is a section view taken substantially in the plane of line 7—7 on FIG. 6.
FIG. 9 is a vertical section view showing an illustrative air pilot operated purge valve utilized in the apparatus shown in FIG. 2.

One illustrative inlet filter and shuttle valve assembly 28 is shown in FIGS. 6 and 7. The filter and shuttle valve assembly 28 is mounted in sealed engagement with the upper surface of one extending end of the input manifold 22, as shown in FIG. 2. The valve assembly 28 is contained within a housing 70, in the form of a twin bore rectangular prism of similar configuration to the tower sections 21 and manifolds 22, 24. The housing 70 is formed with parallel bores 71, 72 corresponding in alignment with the inlet manifold ports 58, 59. A gasket 74 provides a seal between the valve assembly housing 70 and the manifold 22. For feeding air or gas into the apparatus, an air inlet port 29 is provided in the valve assembly housing 70 adjacent the end thereof opposite from the end mounted on the inlet manifold. The free end of the housing 70 is closed by an end plate 75 bolted to the housing 70 together with an appropriate sealing gasket 76.

For removing entrained liquids, such as water, from the incoming gas, such as air, an appropriate filter assembly is mounted in each bore 71, 72 adjacent the air inlet port 29. The filter assemblies may be of any appropriate configuration depending upon the particular gas being fractionated. In the case of air, in order to remove entrained water, the filter may be of two parts, an upper, five micron filter element 78 for purposes of removing bulk liquids and a second or lower, three hundredths micron coalescing filter 79 for removing more finely divided liquid aerosol particles. The filters 78, 79 are sleeve shaped in configuration and are supported on a bulkhead 80 mounted in each bore 71, 72 adjacent the outlet end thereof. For trapping water or liquid removed by the coalescing filter 79, the bulk head 80 includes an annular rib 81 defining a trough 82 surrounding the filter element. The trough 82 opens into an outlet port 84 defined in an outlet fitting 85. A drain valve 86 is mounted to the outlet fitting 85 and includes a pilot controlled valve element 88 adapted to be opened and closed to permit periodic draining of accumulated liquid through an outlet 89. The drain valve 86 is controlled by a pilot operated actuator 90 which receives a pilot air signal from an appropriate source of pilot air when actuated by the equipment controls.

The first stage or five micron filter 78 is also sleeve shaped in configuration and is supported on an annular cup 92 sealingly engaged with the internal wall surface of the housing bore and defining therewith a liquid accumulating trough 94. The sleeve filter is secured to the cup 92 by a cap 95, mounted on the upper end of the sleeve and secured to the cup by a bolt 96 and a lower perforated plate 98. Liquid which is collected on the exterior surface of the upper sleeve 78 drains into the trough 94 and is discharged through a drain valve 99 secured to the housing 70. The upper drain valve is of a configuration similar to the lower drain valve 86 and includes the same valve and control elements, including a valve element 88a, an outlet port 89a, and a pilot control 90a. When the drain valves 86, 99 are actuated, air pressure in the system forces any accumulated liquid out of the inlet filter assembly to a drain or sump.

For directing inlet air alternately into one or the other of the inlet manifold ports 58, 59, and thence into the inlet manifold bores 40, 41, the inlet valve assembly includes a shuttle valve 100, of the flip-flop or pressure positionable type, mounted adjacent the outlet end of the housing 70 (FIG. 6.). For this purpose, a slot 101 is cut in the median wall 102, between the bores 71, 72 and supports a rocker arm 104 pivoted to the intermediate wall 102 by a pivot pin 105. At each of its opposite ends, the rocker arm 104 includes valve plates 106, 107 either rigidly or pivotally affixed thereto. In the configuration shown, each valve plate is in the form of a disk with annular O-ring seal 109 in its lower surface adapted to seat and seal against the upper surface 51 of the inlet manifold surrounding each inlet port 58, 59, depending on the position of the rocker arm 104.

The shuttle valve 100 acts in the manner of a check valve. If, for example, pressure in one inlet manifold bore 40 is less than the pressure in the other inlet manifold bore 41, as a result of the purge valve from the former bore 40 being open, the shuttle valve 100 will position itself to close the inlet port to the former bore 40, as shown in FIG. 6. In the event the relative pressures in the bores shift, as a result of a shift in purge valve activation, the shuttle valve rocker arm 104 will swing to its other position, and referring to FIG. 6, will close the previously open inlet port 59 and open the previously closed inlet port 58.

Figure 8:
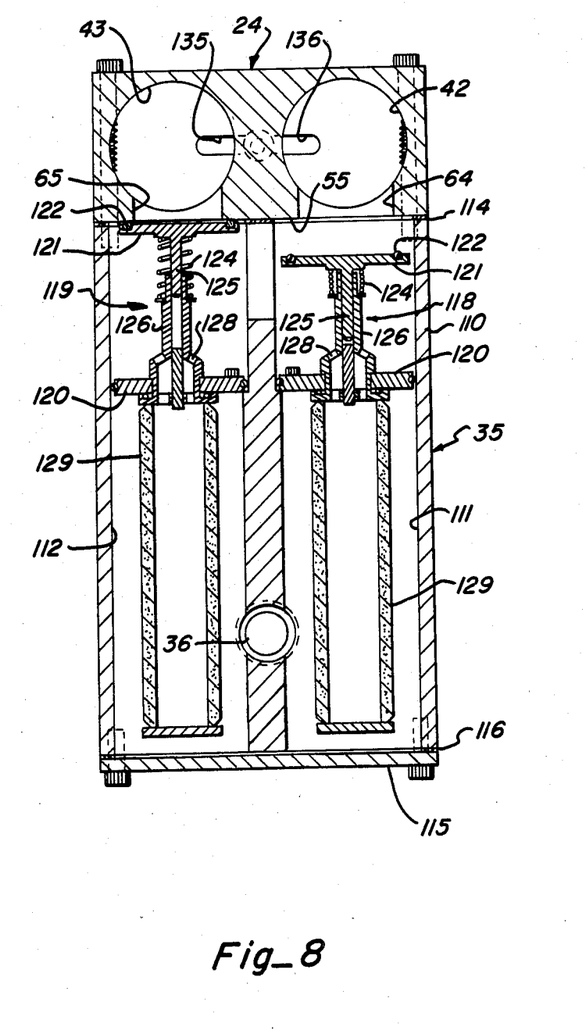
FIG. 8 is an enlarged section view taken substantially in the plane of line 8—8 on FIG. 2.

For controlling the outlet gas flow from the outlet manifold 24, the outlet check valve assembly 35 is mounted below one extending end of the outlet manifold 24 as shown in and in FIGS. 2 and 8, operative association with the outlet manifold bores. The outlet check valve assembly 35 is housed in a twin bore prismatic housing 110 which is similar in configuration to the housing configuration of the tower and outlet manifold 24, and the inlet shuttle valve 28. The pair of bores 111, 112, each open at one end to the outlet ports 64, 65 of the output manifold 24 when the housing 110 is positioned in sealed engagement with the lower surface 55 of the outlet manifold. A sealing gasket 114 is utilized to prevent leakage. The opposite end of the check valve housing 110 is closed by a plate 115 and interposed gasket 116, the air outlet 36 being located adjacent the plate end.

A pair of spring biased check valves 118, 119, both of identical configuration, are supported on a bulkhead 120 secured in the housing bores 111, 112. Each check valve includes a valve plate 121 and annular sealing ring 122 adapted to sealingly engage the undersurface 55 of the outlet manifold. The valve plates 121 are normally biased towards the outlet manifold by coil springs 124 or other appropriate biasing devices. The check valve plates 121 are supported on a valve stem 125 guidably received in a guide sleeve 126 supported on the bulkhead 120. The bulkhead includes central flow passages 128, and if desired, the bulkhead can further support a 0.03 micron coalescing filter 129 to remove any possible sorbent or desiccant dust from the outlet air. Depending on the respective pressures in each of the outlet manifold bores 42, 43, one or the other of the check valves will be closed with the opposite one remaining open, as shown in FIG. 8. Upon a shift in pressure as a result of a shift in opening and closing of the purge valves, the check valves will reverse position.

Figure 11:
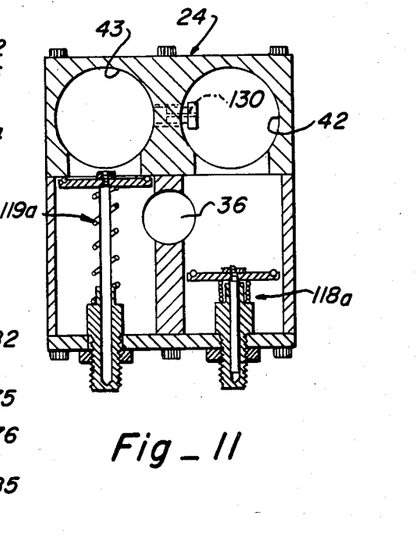
FIG. 11 is a vertical section view showing a modified form of outlet check valve for use in the apparatus shown in FIG. 2.

It should be understood that it is not necessary for all applications to use a filter in the outlet flow line behind the check valves 118, 119. The check valve assembly can thus be substantially simplified as shown in FIG. 11. In this modification, check valves 118a and 119a are similar in construction to valves 118 and 119 shown in FIG. 8, and control the flow of gas from the outlet manifold bores 42 and 43 to the outlet 36.

For providing a source of low pressure air to the outlet manifold bore not containing the high pressure output air, an orifice 130 is provided extending through the wall between the respective outlet manifold bores 42, 43. The orifice 130 is sized to provide the desired pressure reduction from the high pressure outlet bore to the low pressure outlet bore in order to afford a purge gas flow.

Figure 13:
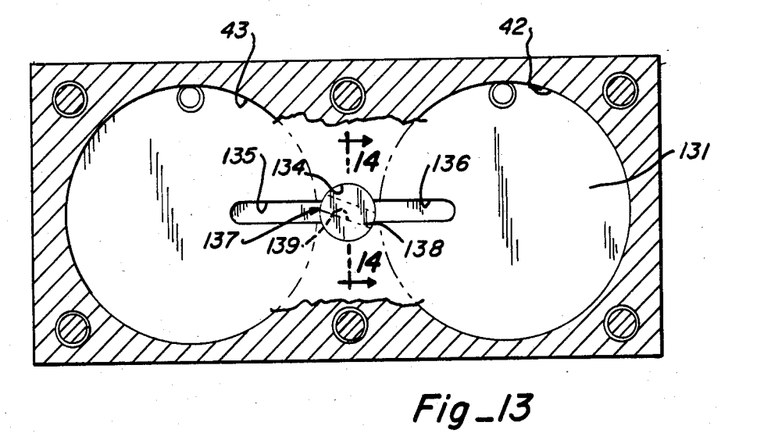
FIG. 13 is an enlarged elevation view showing a modified form of end plate and orifice assembly for use in the apparatus shown in FIG. 2.
Figure 14:
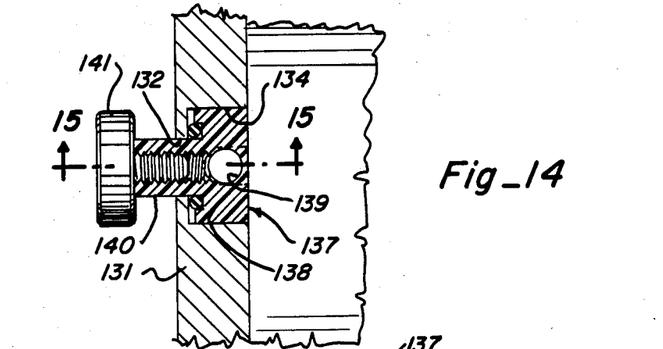
FIG. 14 is a section view taken substantially in the plane of line 14—14 on FIG. 13.
Figure 15:
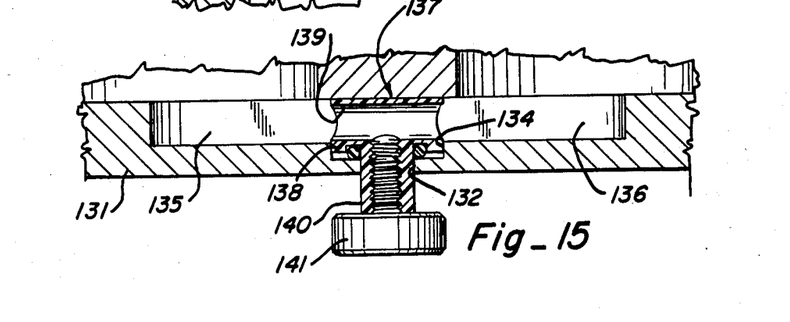
FIG. 15 is a section view taken substantially in the plane of line 15—15 on FIG. 14.

As an alternative to a permanently mounted orifice 130, the end plate 131 on the outlet manifold 24 adjacent the check valve assembly 35 may include an adjustable orifice valve assembly, as shown in FIGS. 13, 14 and 15. To this end, the end plate 131 includes a central bore 132 opening from its outer surface into a counter bore 134 opening to its inner surface, with channels 135, 136 extending from side of the counter bore into alignment with each of the manifold bores 42, 43, respectively. A plug valve 137, including valve body 138 defining a central passage 139, and a stem 140, is mounted in the end plate 131 with the stem extending outwardly through the bore 132 to the outer surface of the plate where it is provided with a knob 141. The plug valve body 138 fits in the counterbore 134. By adjusting the angular position of the plug valve bore 139 with respect to the counterbore 134 and channels 135, 136, the amount of air flow through the orifice passage thus defined can be readily adjusted.

Figure 3:
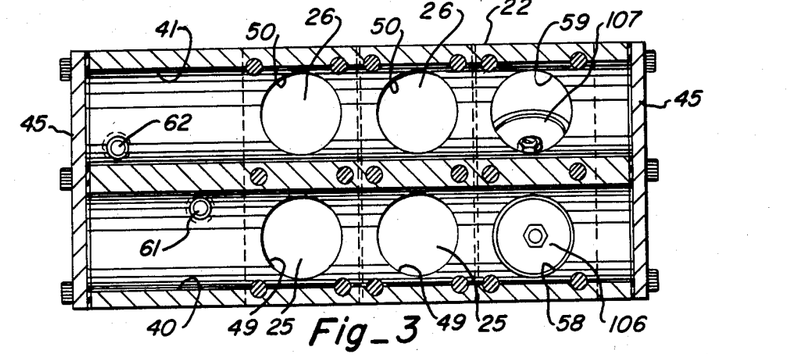
FIG. 3 is an enlarged section view taken substantially in the plane of line 3—3 on FIG. 2.
Figure 4:
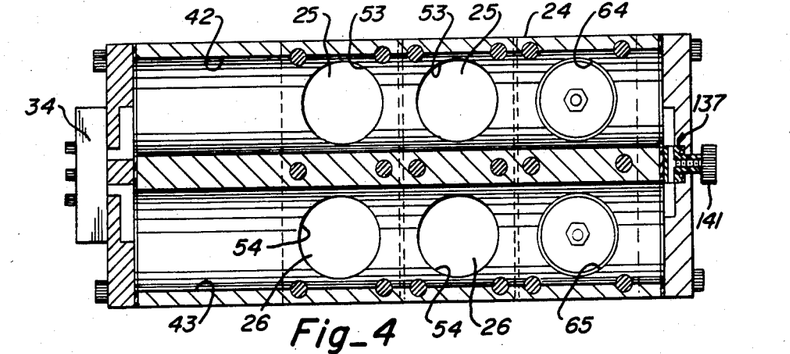
FIG. 4 is an enlarged section view taken substantially in the plane of line 4—4 on FIG. 2.
Figure 5:
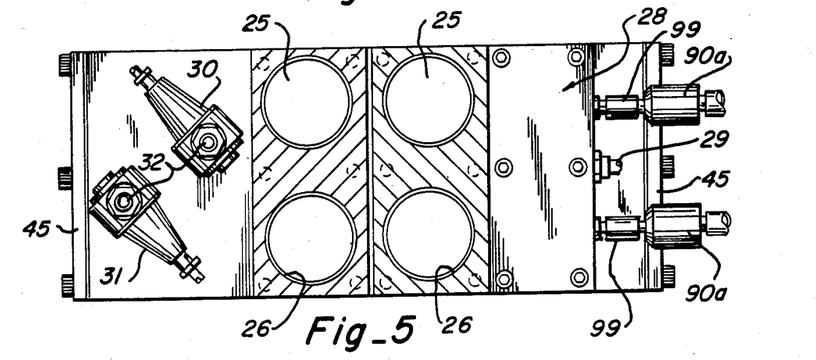
FIG. 5 is an enlarged section view taken substantially in the plane of line 5—5 on FIG. 2.

Flow of gas through the tower apparatus is controlled by opening or closing a respective purge valve thereby determining the path of flow of the gas through the apparatus. An illustrative purge valve, two of which 30, 31 are provided, is shown in FIG. 9. A purge valve 30, 31 is connected in communication with each of the inlet manifold bores 40, 41 through a respective one of the purge valve ports 61, 62 (FIG. 3). Each purge valve 30, 31 is a simple, pilot operated poppet valve, although solenoid actuated valves or the like may be utilized to advantage in some applications. Briefly, each purge valve comprises a valve body 150 having an inlet bore 151, an outlet bore 152 and a valve chamber 154, defining a valve seat 155. The inlet bore 151 is connected through an appropriate conduit 156 to one of the purge valve ports 60, 61 in the inlet manifold 22. A valve poppet 158 including a sealing surface 159, and guided by a valve stem 160, is biased by a spring 161 into seating engagement with the valve seat 155 to control gas flow.

For acting on the valve stem 160 to urge the poppet valve 158 into an open position against the biasing force of the spring 161, an appropriate actuating means, such as a pilot operated diaphragm mechanism 162 is utilized. The pilot actuator comprises a bonnet 164 having a fitting 165 at one end connected to a source of pilot gas pressure through a pilot line 166. The opposite end of the bonnet 164 is closed by a diaphragm 168 centrally supporting a valve stem engaging plate 169. When the bonnet 162 is mounted on the valve body, the diaphragm plate 169 engages the end of the poppet valve stem 160. Upon the application of pilot pressure to the bonnet, the diaphragm is forced outwardly thereby engaging the valve stem to move the valve poppet 158 off of the valve seat 155 to open the pilot valve and permit gas to flow, as shown in FIG. 9.

Alternatively, a solenoid mechanism may be used to actuate the valve stem to open or close the poppet valve, or other types of pilot actuated valves may be utilized such as valves with a balanced poppet. A variety of valve constructions are well known to those of ordinary skill in the art and are available commercially.

A similar pilot actuated poppet or spool valve mechanism may be utilized on the end of the outlet manifold opposite from the outlet check valves for purposes of repressurizing the tower bore following regeneration in order to bring the tower up to pressure before shifting the cycle. Pilot actuated valves for this purpose are also well known in the art. Referring to FIG. 2, such a repressurization valve assembly 34 would be mounted in an appropriate housing on one end of the outlet manifold 24.

Figure 10:
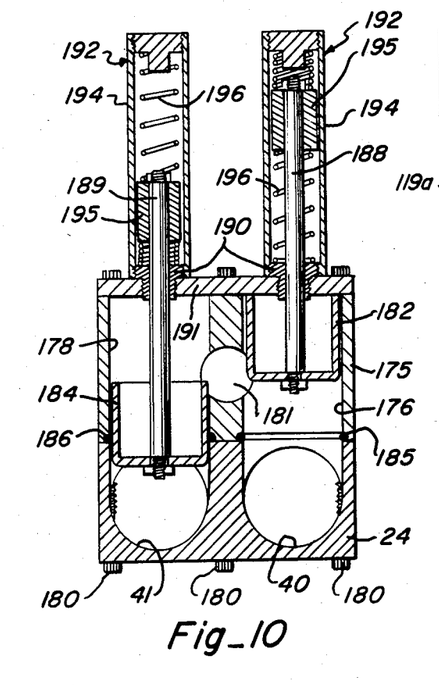
FIG. 10 is a vertical section view showing a modified form of inlet control valve for use in the apparatus shown in FIG. 2.

A modified form of inlet control valve is shown in FIG. 10. In this modification, the inlet valves, instead of being flip-flop or check type valves, as shown in FIG. 6, are pilot actuated valves which are positively positioned in either an open or closed configuration. The modified form of valve is further simplified in that it illustrates a valve construction which may be utilized without an accompanying filter. This is not to say, however, that a filter assembly could not be associated with such a valve or utilized in the inlet air line.

The modified form of inlet control valve shown in FIG. 10 comprises a housing 175 formed in a prismatic extrusion similar to that utilized for the tower and manifold elements. The housing includes a pair of internal bores 176, 178, and is sealed to the upper surface of the manifold 22 and retained by bolts 180. An inlet port 181 is provided to direct air into either of the valve bores 176, 178. For purposes of opening or closing one of the bores 176, 178 to its respective manifold bore 40, 41, a sliding valve cap or plunger 182, 184, is provided in each respective bore 176, 178. A pair of O-ring seals 185, 186 in the bore walls, sealingly engage the valve plunger 182, 186 when the same is in a closed position, as well as seal the valve housing 175 to the manifold 24, as shown in FIG. 10. Each valve cap or plunger 182, 186 is positioned by a valve stem 188, 189 slidably mounted in a journal bearing 190 in the end plate 191 closing the upper end of the inlet valve housing 175. For driving the respective valve stems 188, 189 to position the plunger, a double acting spring return pilot valve air cylinder 192 is provided in engagement with each valve stem 188, 189. The pilot actuated double acting spring return valve actuating mechanism comprises a housing 194 containing a slidable piston 195 secured to the respective valve stem 188 or 189. A coil spring 196 biases the piston 195 to one end or the other of the housing 194, depending on the location of the spring 196. To position the valve cup 182, 184 in the desired position, pilot air is provided through appropriate ports (not shown) to one side or the other of the piston 195 in a conventional manner through an appropriate three-way or four-way control valve mechanism (not shown).

Figure 12:
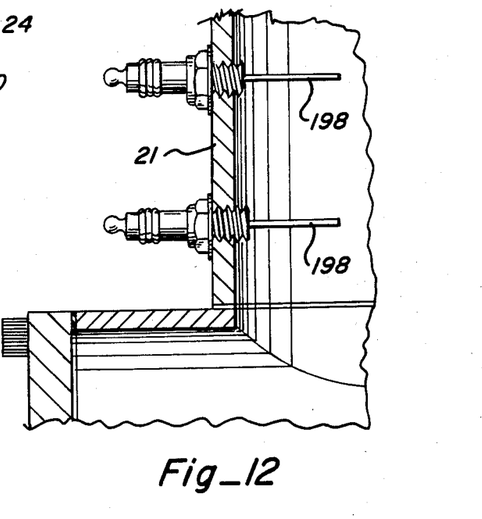
FIG. 12 is a vertical, fragmentary section view showing a moisture sensing mechanism for use in the apparatus shown in FIG. 2.

For determining the movement of a moisture front through a desiccant bed, appropriate conductivity sensing electrodes may be inserted into the desiccant bed, as shown in FIG. 12. The electrodes 198 are connected to a low voltage ac or dc potential applied between the electrode and the wall of the desiccant tower. Because the conductivity of the desiccant bed is increased as its moisture content increases, the presence of a moisture front can be readily detected.

For controlling the cycling operation of the twin tower gas fractionation apparatus as shown in the drawings, any appropriate control circuit may be utilized. The control may be a mechanical clock and mechanical valve actuation mechanism, an electrical timer and solenoid controls, an electronic timer and air pilot operated valve controls, or a microprocessor controlled integrated circuit embodying both the electronic circuitry and pilot air control valves on single or multiple printed circuit boards.

The control system for the twin tower gas fractionation apparatus embodying the present invention, in its preferred form, comprises a microprocessor controlled, single or multiple board variable timer with air pilot actuated valve operation. The system utilizes a pair of air pilot operated purge valves as the primary control valves, with a flip-flop inlet control valve, outlet check valves, and an air pilot actuated quick repressurization valve. The microprocessor controller for the apparatus provides control by supplying air pilot signals to the purge valves more specifically, the microcomputer, following instructions in read only memory, reads in predetermined settings supplied by input switches, or stored in read only memory, compares these settings to the time into the cycle as maintained internally in the computer, and produces control signals to appropriate latches and drivers. The drivers control the operation of solenoid valves, also mounted on the board, which in turn actuate pilot air valves, also mounted on the board, to supply air pilot signals to control the purge valves, drain valves and repressurization valve. The drivers may optionally control switches and circuits to provide signals to indicator lamps and other devices. Additionally, variable input signals from the apparatus may be utilized to control the fractionation and purge cycles. These signals include, principally in the case of an air dryer, the position of the moisture front in the tower, as determined by a conductivity measurement, as well as various pressure, temperature, gas flow and other parameter signals. The particular signals and parameters measured depend on the fractionation operation involved. The microprocessor can be readily programed to accept a variety of input signals and produce as an output the necessary signals for controlling the fractionation and purge cycles. Circuits may also be provided to produce alarm when an operating condition is outside of a predetermined parameter range.

Figure 16:
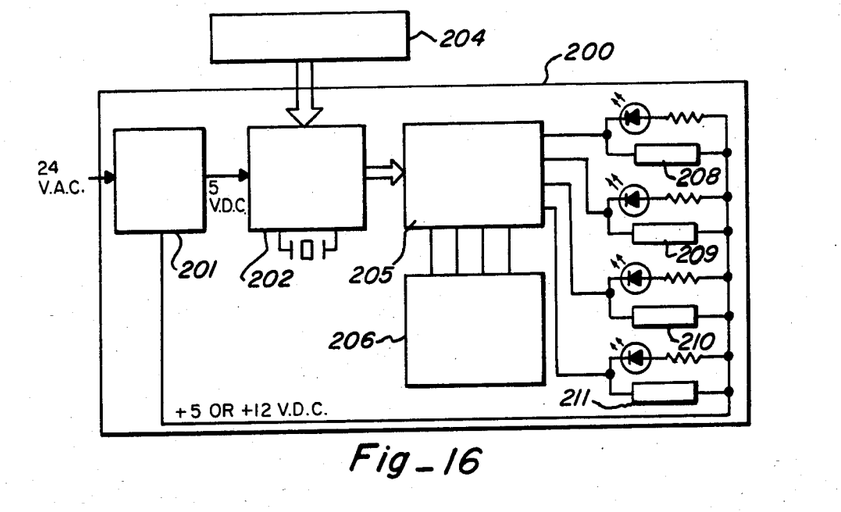
FIG. 16 is a schematic diagram of a single board microprocessor controller for the apparatus shown in FIG. 1.

An illustrative single board microcomputer controller circuit for a gas fractionation apparatus of the character described is shown in FIG. 16. The circuit comprises a circuit board 200 supporting a power supply 201 which receives, for example, a 24 volt ac input and produces +5 and +12 dc voltage outputs for the various current components. The board further supports a microcomputer 202 operated on a 5 volt dc power supply, and adapted to receive input signals and parameters from a switch bank 204. The microcomputer 202 produces an output of control signals to appropriate latches and drivers 205 which in turn produce appropriate electrical output signals to actuate indicators 206 and the like, and actuate the various solenoids which control air pilot control valves 208, 209, 210, 211, as shown in FIG. 17.

Figure 17:
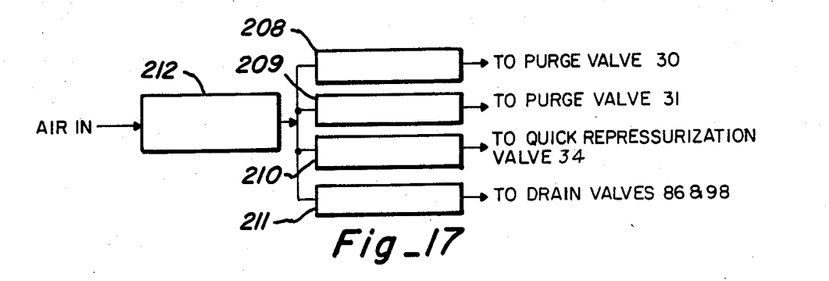
FIG. 17 is a schematic diagram of a pilot air control circuit for use with the circuit shown in FIG. 15.

In the pilot air circuit shown in FIG. 17, pilot air, such as might be tapped from the output of a twin tower dryer, is fed through a filter and pressure regulator circuit 212 and thence to the various solenoid actuated pilot valves 208–211 inclusive. The output of two of the valves 208, 209 are utilized to actuate the purge valves 30, 31. Solenoid actuated pilot valve 210 actuates the quick repressurization valve 34, while solenoid actuated air pilot valve control 211 actuates the drain valves 86, 98 on the inlet filter and valve assembly.

Figure 18:
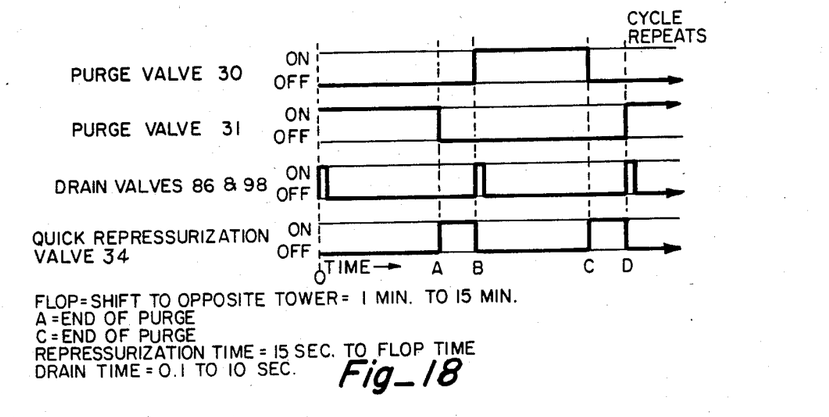
FIG. 18 is a timing diagram for operation of the tower shown in FIG. 1.

An illustrative operating cycle for a gas fractionator is shown in FIG. 18. The cycle diagram illustrates the valves 30 and 31 as either "on" or "off", beginning at time zero (0), with "time" running from left to right on the diagram. At start up, one purge valve 30 remains "off" while the other purge valve 31 is "on" or open. Gas to be fractionated circulates through a gas fractionation bed in one bore 25 of the tower 21 while purge gas flows through the other bore 26 of tower 21. The drain valves 96, 98 are momentarily turned "on" and then quickly closed to prevent the loss of air. The quick repressurization valve 34 remains "off". After a selected period of time, at time A, for example, as determined by the microprocessor, the other purge valve 31, which opens air flow through the tower being purged, closes and simultaneously the quick repressurization valve 34 opens to repressurize the purged tower bore. After a quick repressurization time, indicated at time B, the first purge valve 30 to the previously active tower opens to initiate the purge cycle. Simultaneously, the drain valves 86, 98 open for a short period of time to discharge any water or moisture or other component collected, and the quick repressurization valve then closes. After a further cycle time, shown in time C, again determined by the microprocessor, the purge valve 30 to the tower being regenerated closes and the quick repressurization valve opens. After repressurization, at time D, the purge valves again shift, with purge valve 31 being opened to facilitate regeneration of its associated tower bore, the drain valves open momentarily, and the repressurization valve 34 closes. The cycle continuously repeats, with the various cycle times being either fixed or variable as determined by the microprocessor.

An alternative multiple board microprocessor circuit utilizes a bus-card controller. Circuits of this type embody a standard bus and CPU card, with associate power supply cards, switch outputs card, pneumatic outputs card, alarms and indicator output cards, and remote control condition sensing, and monitoring cards.

The CPU card for the twin tower multiple board controller utilizes a microprocessor with read only memory (ROM), random-access-memory (RAM), address decoding, crystal controlled clock, power up reset, bus buffering and optional timers and parallel input/output ports. The program to be executed to accomplish the desired control functions is contained in the ROM and is supplied in any of the various common forms ROM such as a mask program, electrically programable, UV erasable electrically programable or electrically erasable and programable form. The program may contain inquiry provisions to inquire as to provide automatic servicing of those cards when present. All control of the machine is under the direction of the CPU card.

The power supply and switched electric outputs card uses 24 volts ac, 50/60 Hertz input, and supplies +12 volts dc unregulated and +5 volts dc regulated, to the bus. It also provides four memory-mapped zero-crossing switched 24 volt ac outputs controlled by the bus. The pneumatic outputs card provides four memory-mapped switched compressed air logic outputs controlled by the bus. The alarms outputs card provides four memory-mapped zero-crossing ac switched outputs controlled by the bus. The remote control and monitoring card receives serial data from a telephone line, converts it to parallel and sends it to the bus. It also receives parallel data from the bus, converts it to serial and sends it to the telephone line.

The desiccant condition sensing card receives analog data from sensors, either of the conductivity or capacitance measuring type, which sensors are in physical contact with the desiccant. The card conditions or analyzes that data in appropriate instrumentation amplifiers, multiplexes the data in an analog to digital converter, and makes it available to the bus. The data is examined by a sofware algorithm which, by averaging the most recent data, and comparing the average to expected values, will continually update the time values of the purge cycles, resulting in the use of only as much purge air as is required for the current loading of the desiccant. Thus the dryer will automatically compensate for variable inlet conditions such as air flow, temperature, moisture content, pressure and for desiccant degradation.

The twin tower unit, consisting of the towers, manifolds, and various valve assemblies, is readily assembled and disassembled, being secured together by bolts with intermediate gaskets. This facilitates assembly in that external piping is kept to a minimum. The tower construction is expandable by use of multiple tower units utilizing common controls. By forming both adsorbent containing tower cylinder bores in a single extrusion prism, heat transfer between the beds is substantially facilitated. Heat energy produced during the adsorption reaction is conserved and is efficiently utilized to assist in the regeneration of the adsorbent bed.

While a certain illustrative embodiment of the present invention has been shown in the drawings and described above in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

We claim:

1. A method of controlling gas flow for the adsorptive fractionation of gases in a twin tower gas fractionation apparatus including a generally elongated prism shaped tower of heat conductive material integrally defining first and second parallel tower bores extending axially longitudinally through said tower, said first and second tower bores containing first and second sorbent beds respectively, an input manifold sealingly secured to said tower at one end thereof, an output manifold sealingly secured to said tower at the other end thereof, the tower bores extending between the input and output manifolds, each of said manifolds being formed as an elongated prism, means in each said manifold defining first and second parallel manifold bores extending therein, means in each manifold for communicating the first and second manifold bores with the corresponding first and second tower bores respectively, said inlet manifold including in communication with each manifold bore an inlet gas port for receiving a gaseous mixture to be fractionated and an outlet port for discharging purge gas to regenerate or purge the sorbent bed in the corresponding tower bore, and said outlet manifold including in communication with each manifold bore an outlet gas port for discharging fractionated gas and a restricted orifice opening extending between said first and second outlet manifold bores for introducing purge gas from said stream of fractionated gas in one outlet manifold bore to the other outlet manifold bore, an inlet gas control assembly comprising an inlet housing mounted on said inlet manifold in operative alignment with said inlet gas ports, a shuttle valve in said inlet housing including first and second shuttle valve members operatively positioned for selectively opening and closing said first and second inlet gas ports respectively in response to a relative predetermined pressure differential in the first and second inlet manifold bores, an outlet gas control assembly including an outlet housing mounted on said outlet manifold in operative alignment with said outlet gas ports, a check valve operatively positioned in said outlet housing for controlling the fractionated gas flow from the associated outlet gas port in relation to the pressure at the outlet gas port, and first and second pilot controlled purge valves operatively mounted on said inlet manifold in communication with the outlet port of said first and second inlet manifold bores respectively; said method comprising the steps of directing a flow of the pressurized gaseous mixture to be fractionated containing a component to be adsorbed from a source thereof to said shuttle valve, withdrawing a major flow of pressurized gas lower in said adsorbable component from one outlet gas port of said outlet housing while conducting a minor flow of said gas lower in said adsorbable component at a predetermined lower pressure as a purge gas through the restricted orifice opening from the one bore to the other bore of said outlet manifold, the pressure of the major flow of pressurized gas in the one bore of the outlet manifold corresponding to the sorbent bed receiving the flow of pressurized gaseous mixture being sufficient to open the check valve operatively associated with the one outlet gas port of the one bore, the predetermined lower pressure of the minor flow of gas conducted by the restricted orifice opening to the other bore of the outlet manifold being insufficient to open the check valve operatively associated with the outlet gas port of the other bore, opening the first one of said purge valves for exhausting purge gas from the corresponding first of said sorbent beds, the opening of said first purge valve effecting a pressure reduction in said first corresponding sorbent bed and in the first manifold bore associated therewith, said pressure reduction causing said shuttle valve to shift to close the corresponding inlet port to said first inlet manifold bore and simultaneously open the inlet port to the second inlet manifold bore to direct the flow of pressurized gaseous mixture to the second sorbent bed wherein said adsorbable gas component is at least partially removed from the gaseous mixture, closing said first purge valve after a first purge time sufficient to purge said first one of said sorbent beds of the adsorbed gas component, flowing pressurized gas through said second one of said sorbent beds for a first adsorbing time period at least equal to said first purge time but not exceeding the time period in which said second sorbent bed would become saturated with said adsorbable gas component, and at the end of said first adsorbing time period opening the second one of said purge valves to exhaust purge gas from said second sorbent bed and simultaneously effect a pressure reduction in the second inlet manifold bore and in the corresponding second sorbent bed, the pressure reduction causing said shuttle valve to shift to close said second corresponding inlet gas port and open the first inlet gas port corresponding to said first inlet manifold and first sorbent bed to direct the pressurized gaseous mixture thereto wherein said adsorbable gas component is at least partially removed from the gaseous mixture, and continuously repeating said steps to alternately shift said sorbent beds from adsorption to purge by directly controlling the opening and closing of substantially only the first and second purge valves, thereby to provide for the continuous adsorption of said adsorbable gas component from said pressurized gas.

2. A method as defined in claim 1 wherein the step of controlling the operation of said purge valves comprises sensing the conductivity of the sorbent bed in said tower bores and sending a signal representative thereof to a control microprocessor which embodies an algorithm for determining the cycle of operation of the purge valves and controlling the opening and closing of the purge valves by signals from the microprocessor controller.

3. A method as defined in claim 1 wherein said twin tower fractionation apparatus further includes a repressurization passage communicating between the bores of said output manifold and a repressurization valve connected in the repressurization passage to control gas flow therethrough, said method further comprising the step of repressurizing the purged sorbent bed upon the closing of the corresponding purge valve therefrom and prior to the opening of the purge valve from the other sorbent bed by opening the repressurization valve.

4. A method as defined in claim 3 the step of controlling the operation of said purge valves comprises sensing the conductivity of the sorbent bed in said tower bores and sending a signal representative thereof to a control microprocessor which embodies an algorithm for determining the cycle of operation of the purge valves and controlling the opening and closing of the purge valves by signals from the microprocessor controller.

5. A method of controlling adsorption and desorption of the sorbent beds of a twin tower fractionation apparatus by controlling substantially only the opening and closing of each of two purge valves of said apparatus to supply a substantially continuous flow of delivered gas from which an adsorable component has been adsorbed, each tower of said apparatus containing a sorbent bed through which a flow of supplied pressurized gaseous mixture is passed, the supplied gaseous mixture containing the adsorbable component, each sorbent bed operatively adsorbing the component from the pressurized gaseous mixture upon passing of the gaseous mixture therethrough, each sorbent bed also operatively desorbing or purging the component upon flowing a purge gas therethrough, the purge gas being derived from a percentage of fractionated gas from which the adsorbable component has previously been adsorbed, said method comprising:

providing an inlet manifold having a first bore in fluid communication with the first tower and the first sorbent bed in the first tower, the inlet manifold also having a second bore in fluid communication with the second tower and the second sorbent bed in the second tower, supplying a flow of pressurized gaseous mixture to the inlet manifold, directing the gaseous mixture to a selected one of the first and second bores of the inlt manifold through a differential pressure responsive inlet valve, operatively connecting the pressure responsive inlet valve to respond to the differential pressures between the two bores of the inlet manifold, directing the gaseous mixture into one bore of the inlet manifold by substantially reducing the pressure in the other bore of the inlet manifold, selecting the one of the first or second bores in the inlet manifold to which the gaseous mixture is directed by opening and closing first and second purge valves respectively connected in fluid communication with the first and second bores in the inlet manifold, bleeding a minor portion of the fractionated gas exiting the sorbent bed of each tower back to the other tower as the purge gas, the gas exiting the sorbent bed having been substantially reduced of the component due to adsorption thereof by the sorbent bed, opening the first purge valve to reduce the pressure in the first bore of the inlet manifold and to cause the inlet valve to direct the gaseous mixture into the second sorbent bed and to cause the purge gas derived from the fractionated gas exiting the second sorbent bed to flow through the first sorbent bed and desorb any of said component previously adsorbed to thereby regenerate the first sorbent bed, closing the first purge valve after the first sorbent bed has been desorbed to a predetermined extent of the adsorbed component, opening the second purge valve to reduce the pressure in the second bore of the inlet manifold and to cause the inlet valve to direct the gaseous mixture into the first sorbent bed and to cause the purge gas derived from the fractionated gas exiting the first sorbent bed to flow through the second sorbent bed and desorb any of said component previously adsorbed to thereby regenerate the second sorbent bed, closing the second purge valve after the second sorbent bed has been desorbed to a predetermined extent of the adsorbed componet; and continuing in order the steps of opening the first purge valve, closing the first purge valve, opening the second purge valve and closing the second purge valve to supply the substantially continuous flow of delivered gas.

6. A method as defined in claim 5 further comprising: selectively conducting a repressurizing flow portion of fractionated gas exiting each tower back to the other tower after the closing of one purge valve and before opening of the other purge valve to repressurize the one sorbent bed and associated one tower and the associated one manifold bore to essentially the pressure of the fractionated gas exiting the other sorbent tower.

7. A method as defined in claim 6 further comprising: sensing the saturation condition of the sorbent bed in the one tower through which the gaseous mixture is flowing, and controlling the opening of the purge valve associated with the one tower in predetermined relation to the sensed saturation condition.

8. In an apparatus for adsorptive fractionation of a gaseous mixture, including at least a pair of sorbent beds, means for directing a flow of the gaseous mixture from a source thereof to one of the beds for removing a gaseous component of said mixture while simultaneously directing a flow of purge gas through the other of said beds for stripping the adsorbed gas component theretorm, and means for controlling the flow of said gases to and from said beds, the improvement comprising, a generally elongated prism shaped tower of heat conductive material, and means integrally in said tower prism defining a pair of parallel tower bores extending axially longitudinally through said tower, and said tower bores being adapted each to contain a sorbent bed, an input manifold sealingly secured to said tower at one end thereof, an output manifold sealingly secured to said tower at the other end thereof, the tower bores extending between the input and output manifolds, esch of said manifolds being formed as a one-piece elongated prism, means integrally in each said manifold defining a pair of parallel longitudinally extending manifold bores, means in each manifold defining a communication port for communicating each manifold bore with a different one of said tower bores, said inlet manifold including inlet gas ports for receiving a gaseous mixture to be fractionated and outlet ports for discharging purge gas, said outlet manifold including outlet gas ports for discharging fractionated gas, and said tower prism and said inlet and outlet manifolds having essentially the same cross-sectional configuration taken transverse to the bores therethrough.

9. Apparatus as defined in claim 8 wherein said outlet manifold includes a restricted orifice opening extending between said outlet manifold bores for introducing purge gas from said fractionated gas to a tower bore to be purged.

10. Apparatus as defined in claim 9 where the improvement further comprises means for sensing the concentration of the absorbed component in the sorbent bed and sending a signal functionally related to said concentration to said controlling means for use in controlling the flow of gases to and from said beds.

11. Apparatus as defined in claim 10 wherein said sensing means comprises at least a pair of probes extending through the tower wall into the sorbent bed, and means utilizing said probes for measuring the conductivity of said sorbent bed as a function of the adsorbed gas content thereof.

12. Apparatus as defined in claim 11 wherein said sensing means comprises at least a pair of spaced apart electrical probes extending diametrically into a tower bore in intimate contact with the adsorbent material contained therein, and means for sensing and measuring the conductivity of the adsorbent material between said electrodes and the tower wall and producing a signal related thereto.

13. Apparatus as define in claim 8 wherein the improvement further comprises means including a microprocessor for controlling the flow of gases through said apparatus.

14. Apparatus as defined in claim 13 wherein the improvement further comprises means for sensing operating conditions of said apparatus and for feeding signals representative thereof to said microprocessor, said microprocessor producing output control signals for controlling the operation of said apparatus.

15. Apparatus as defined in claim 8 wherein said tower prism and said inlet and outlet manifolds are lengths of an extruded metal piece having a consistent cross sectional configuration along the length of the metal piece.

16. Apparatus as defined in claim 8 wherein the longitudinal extent of the manifold bores is perpendicular to the longitudinal extent of the tower bores.

17. Apparatus as defined in claim 16 wherein the manifold bores of the inelt and outlet manifolds extend parallel to one another.

18. Apapratus as defined in claim 17 wherein a plurality of tower prisms extend between the inlet and outlet manifolds.

19. Apparatus as defined in claim 8 wherein the communication ports are of approximately the same cross sectional size as the bores.

20. Apparatus as defined in claim 19 wherein the communication ports are of approximately the same cross-sectional configuration as the bores.

21. In a gas fractionating apparatus embodying parallel sorbent beds, the improvement comprising an elongated prism shaped tower defining a pair of spaced parallel tower bores each adapted to receive and contain a sorbent bed, an inlet manifold, and an outlet manifold, each said manifold comprising a one-piece elongated prism integrally defining a pair of spaced parallel manifold bores, means for sealingly mounting the inlet and outlet manifolds to opposite ends of the prism with the tower bores extending perpendicular to and between the manifold bores, a transverse port opening from each of said manifold bores for communication with a different one of said tower bores when said manifolds are sealingly mounted to said prism, each of said tower and manifold bores having approximately the same cross sectional size, each transverse port having approximately the same cross sectional size as the manifold and tower bores, and each said manifold including inlet and doutlet bores for receiving and discharging gaseous materials.

22. Apparatus as defined in claim 21 further comprising at least a pair of elongated prisms aligned side by side and each defining a pair of spaced parallel bores, each said manifold including a port adapted to open into a corresponding bore in each of said prisms.

23. Apapratus as defined in claim 22 wherein each of the prisms and the inlet manifold and the outlet manifold has approximately the same cross sectional configuration.

24. Apparatus as defined in claim 22 wherein the ratio of the length of the tower bore to tower bore diameter is in the range of about 10 to 1 to about 15 to 1.

25. Apparatus as defined in claim 24 wherein the ratio of the length of the tower bore to tower bore diameter is in the range of about 13 to 1.

* * * * *